US007762722B2

(12) United States Patent
Kuwabara et al.

(10) Patent No.: US 7,762,722 B2
(45) Date of Patent: Jul. 27, 2010

(54) LINEAR MOTION GUIDE UNIT

(75) Inventors: Hideki Kuwabara, Mino (JP); Tamotsu Iwata, Mino (JP)

(73) Assignee: Nippon Thompson Co., Ltd., Tokyo (JP)

(*) Notice: Subject to any disclaimer, the term of this patent is extended or adjusted under 35 U.S.C. 154(b) by 969 days.

(21) Appl. No.: 11/527,419

(22) Filed: Sep. 27, 2006

(65) Prior Publication Data
US 2007/0071372 A1 Mar. 29, 2007

(30) Foreign Application Priority Data
Sep. 27, 2005 (JP) ............... 2005-280362

(51) Int. Cl.
*F16C 29/06* (2006.01)
(52) U.S. Cl. .................................... 384/44
(58) Field of Classification Search ............. 384/13, 384/14, 42, 44, 45; *F16C 29/06, 33/10*
See application file for complete search history.

(56) References Cited

U.S. PATENT DOCUMENTS 5,800,064 A * 9/1998 Ohya .................. 384/44
2006/0078237 A1 * 4/2006 Ishihara ............... 384/45

FOREIGN PATENT DOCUMENTS

| JP | 9-72335 | 3/1997 |
| JP | 10-78032 | 3/1998 |
| JP | 2001-82469 | 3/2001 |
| JP | 2001-248637 | 9/2001 |
| JP | 2006-105310 | 4/2006 |

* cited by examiner

*Primary Examiner*—Thomas R Hannon
*Assistant Examiner*—Phillip A Johnson
(74) *Attorney, Agent, or Firm*—Browdy and Neimark, PLLC

(57) ABSTRACT

A linear motion guide unit is disclosed in which a tubular composition to provide a return passage is high in mechanical stiffness and also makes certain of sustainable application of lubricant to rolling elements rolling through the return passage, thereby ensuring proper lubrication under maintenance-free operation. The tubular composition to make the return passage is composed of a tubular skeleton to guide the rollers, and a porous compact impregnated with lubricant. The tubular skeleton is made up of forward and aft ends, a lengthwise column and a flexible spine, which extend between the ends. The flexible spine includes lengthwise opposite relief portions and a flexible middle section, which fit into the porous compact with separating from the porous compact to make a clearance between them. The flexible spine deflects as the rollers roll through the return passage, permitting the rollers coming into touch with the porous compact to lubricate the rollers.

10 Claims, 8 Drawing Sheets

LINEAR MOTION GUIDE UNIT

FIELD OF THE INVENTION

The present invention relates to a linear motion guide unit comprised of an elongated guide rail, and a slider that is allowed to move on the elongated guide rail relatively to the guide rail by virtue of more than one rolling element.

BACKGROUND OF THE INVENTION

Linear motion guide units conventionally incorporated in diverse machinery are ordinarily fed with lubricant every a preselected interval based on maintenance schedules to make certain of forming the lubricant film separating a rolling element from a load-carrying race, ensuring sustainable smooth rolling motion of the rolling element throughout a circulating circuit. Meanwhile, modern advanced machines and instruments are increasingly needed to work virtually in maintenance-free operating conditions from many aspects of conserving energy as well as keeping running cost and maintenance cost of equipment reasonable. Correspondingly, the linear motion guide units used in the advanced machinery are also challenged to keep the consumption of lubricant to a minimum, along with keeping linear motion guide units virtually maintenance free for lubrication over long-lasting operation.

The linear motion guide units of the class using cylindrical rollers as the rolling elements have been especially needed to work with maintenance free conditions for lubrication. Most conventional linear motion guide units are composed of an elongated guide rail and a slider that moves relatively to the guide rail by virtue of more than one rolling element, which is allowed to roll through a circulating circuit that is made up of a load-carrying race defined between the guide rail and the slider, and a non-loaded area including a return passage and forward and aft turnaround passages made in the slider. With the linear motion guide units constructed as stated earlier, continuous application of lubricant on or between the load-carrying race and the rolling element is inevitable to continue maintaining an adequate lubricant film between the load-carrying race and the rolling element to keep them against metal-to-metal contact that might otherwise occur, thereby making sure of their high durability.

In the commonly assigned Japanese Patent Laid-Open No. H09-72335, there is discloses a linear motion guide unit in which a tubular member, or a sleeve, fits into a fore-and-aft hole bored in a carriage of the slider to provide the return passage. The sleeve is made easier to experience elastic deformation to absorb the frictional resistance occurring on the rolling elements, thereby ensuring smooth running of the rolling elements. With the linear motion guide unit constructed as recited just earlier, cylindrical rollers are selected as the rolling elements while the return passage is defined by the sleeve that fits closely into the return hole cut in the carriage. The sleeve is made it possible to get elastic deformation, ensuring smooth traveling of the slider. Especially, an ample circular clearance is left between the wall surface inside the return passage and the outside surface around the middle area of the sleeve to allow the sleeve to get elastically deformed therein and also reserve lubricant therein.

In another commonly assigned Japanese Patent Laid-Open No. 2001-82469, there is disclosed a linear motion guide unit in which a return passage in a carriage of the slider is made of sintered resinous member of cellular or porous structure that is impregnated with lubricant to be applied on the rolling elements. The return passage is constituted with a sleeve of sintered resinous member having porous or cellular structure, which fits into a fore-and-aft hole made in the carriage of the slider. Oily lubricant or grease once soaked in the sintered resinous member preparatory to fit into the carriage is reserved or retained in the cells or pores in the cellular structure. The rolling elements are constantly applied with oily ingredient of the lubricant while rolling through inside the sleeve, and oil films around any rolling elements get lubricating smoothly the load-carrying surfaces or raceway grooves as the rolling elements run through load-carrying race, with accompanying reduced maintenance.

Another sort of conventional linear motion guide means is disclosed in Japanese Patent Laid-Open No. H10-78032, in which there is used lubricant-containing polymer to lubricate the rolling element of ball. With the prior linear motion guide means recited now, a tubular member allowing the rolling elements running through there is made of tubular composition of lubricant-containing polymer, which is composed of cylindrical skeleton cage of polyethylene high in stiffness or mechanical strength, the skeleton cage being made therein with lengthwise windows opened from the outside to the inside thereof and spaced away circularly from one another at regular intervals around the circular surface of the skeleton cage, and lubricant-containing polymer segments that fit closely into the windows, one to each window. For production of the tubular composition of lubricant-containing polymer, the polyethylene skeleton cage prepared in advance by injection molding is positioned within a preselected mold held in any injection molding machine, and then molten lubricant-containing polymer is poured into the mold cavity, where it solidifies as it cooled, coming into joining integrally with the skeleton cage.

Another Japanese Patent Laid-Open No. 2001-248637 discloses a linear motion guide unit making it easier to ensure lubrication of circulating balls with lubricant that may be simply replenished from the outside of the guide unit, making certain of serving steadier functions in the long run even with no troublesome maintenance work. With the linear motion guide unit stated just earlier, the return passages made in the slider are each provided with a return sleeve that is lengthwise slit and lined with a lubricant applicator over the inside circular surface thereof. The fore-and-aft slit made in the return sleeve constitutes a groove that helps the lubricant spread easier lengthwise from the lubricant applicator covering the fore-and-aft slit.

With the linear motion guide unit in which rollers are selected as the rolling elements, meanwhile, alignment problems to guide rollers in good rolling order without leaning in rolling posture are more encountered, compared with the construction using balls. Besides, the rollers have to be guided not only on their circular surfaces, but also on their axially opposite end surfaces. Conventionally, there is no linear motion guide unit constructed to meet with an aspect of allowing the rollers to roll through the circulating circuit over a long-lasting service life with adequate application of lubricant, making certain of steady reliability of the maintenance-free on lubricant application.

The linear motion guide unit constructed as stated earlier in the first citation, although thought to reserve some amount of lubricant in the circular clearance, would not mean the realistic construction enough to continue feeding the rollers with lubricant, keeping the maintenance-free operation more sustainable and steadier.

With the prior linear motion guide units stated earlier in the second citation, moreover, the return passage made in the carriage of the slider is defined by just sintered resinous member of cellular geometry, which is lack of mechanical stiffness enough to make sure of steady guidance of the cylindrical rollers throughout the circulating circuit. There, advanced technology has come to hope any linear motion guide unit in which the sleeve to define the return passage in the carriage of the slider is much raised in mechanical stiffness, even with simple in construction and easier to fit it into the slider as well as making sure of positive lubricant application to the rolling elements to render the maintenance-free operation more sustainable.

With the prior linear motion guide means recited earlier in which there is used lubricant-containing polymer sleeve to lubricate the rolling element of ball, it is needed to uniformly mix polymer with oily lubricant to prepare the lubricant-containing polymer and, moreover, the lubricant-containing polymer sleeve have to be molded integrally with the skeleton cage of a preselected material high in stiffness. Production of the lubricant-containing sleeve has thus required special equipment and complicated process.

Another commonly assigned Japanese Patent Laid-Open No. 2006-105310 discloses a linear motion guide unit in which a tubular member for the return passage is constituted with a tubular composition made up of a tubular skeleton having windows and porous or cellular members that fit into the windows in the tubular skeleton. With the linear motion guide unit constructed as stated just earlier, the porous members make close fit-engagement over their inside surfaces with their mating outside surfaces of flexible spines in the tubular skeleton. Thus, the porous members could not rid themselves of mechanical deformation when the flexible spines of the tubular skeleton experienced any distortion. Such deformation that might occur in the porous members was undesired in aspects of keeping the circulation of the rollers smoother as well as the positive maintenance-free operation more sustainable.

There, it remains a major challenge to further develop the tubular composition for the turn passage in the slider so as to provide the linear motion guide unit improved in the application of lubricant around the rolling elements as well as smooth guidance of the rolling elements in the return passage.

SUMMARY OF THE INVENTION

The present invention has for its primary object to overcome the major challenges as stated earlier, and to further develop the linear motion guide unit disclosed in the commonly assigned Japanese senior patent application recited above, in which the sleeve or tubular member for the preparation of the return passage is made of a tubular composition that is made up of a tubular skeleton and a compact of porous structure. More particularly, the present invention provides a linear motion guide unit in which a clearance is left between a porous compact and a flexible spine of the tubular skeleton for the return passage while a relief portion is made on the flexible spine for alleviating an stress applied on the flexible spine by circulating motion of the cylindrical rollers, and the porous compact with pores filled with lubricant fits into the tubular skeleton in a way exposing itself to a return passage to come into rolling-contact with more than one rolling element of roller, keeping the positive application of lubricant around the roller more sustainable. Moreover, the provision of the relief portion on the flexible spine serves to relieve the flexible spine of the stress or impact caused by rolling operation of the roller in the return passage, lessening the need for mechanical strength in the tubular skeleton as well as getting the long-lasting smooth travel of the roller in the circulating circuit with accompanying reduced maintenance or maintenance-free for lubrication.

The present invention is concerned with a linear motion guide unit comprising an elongated guide rail having a first raceway groove extending lengthwise of the guide rail and a slider allowed to move relatively to the guide rail by virtue of more than one rolling element comprising rollers, the slider including a carriage thereon with a second raceway groove in opposition to the first raceway groove to form a load race between them and further made therein with a return passage extending in parallel with the load race, end caps secured to forward and aft ends of the carriage and each made therein with a turnaround passage to connect the load race and the return passage with one another, and a plurality of the rollers allowed to roll through a circulating circuit composed of the load race, return passage and a pair of the turnaround passages; wherein the return passage is defined by a hole inside a lengthwise tubular construction that fits into a bore made in the carriage, the tubular construction being made up of a tubular skeleton to guide the rollers therethrough and a porous compact to apply lubricant to the rollers, and the tubular skeleton being comprised of a column to guide any one of axially opposite ends of the roller, and a flexible spine to guide a circular rolling surface of the roller; and wherein the porous compact fits over the flexible spine in such a relation that a clearance remains between an outward surface of the flexible spine and an inward surface of the porous compact to permit flexing of the flexible spine to relieve an stress that is applied to the flexible spine by circulating motion of the rollers.

The present invention is further concerned with a linear motion guide unit comprising an elongated guide rail having a first raceway groove extending lengthwise of the guide rail and a slider allowed to move relatively to the guide rail by virtue of more than one rolling element of roller, the slider including a carriage made thereon with a second raceway groove in opposition to the first raceway groove to form a load race between them and further made therein with a return passage extending in parallel with the load race, end caps secured to forward and aft ends of the carriage and each made therein with a turnaround passage to connect the load race and the return passage with one another, and a plurality of the rollers allowed to roll through a circulating circuit composed of the load race, return passage and a pair of the turnaround passages; wherein the return passage is defined by a hole inside a lengthwise tubular composition that fits into a bore made in the carriage, the tubular composition being made up of a tubular skeleton to guide the rollers through there and a porous compact to apply lubricant to the rollers, and the tubular skeleton being comprised of a column to guide any one of axially opposite ends of the roller, and a flexible spine to guide a circular rolling surface of the roller; and wherein the flexible spine has relief portions made at least in specific locations merging with their associated ends, and a flexible middle section extending between the relief portions to experience any deflection as the rollers roll through the return passage.

In an aspect of the present invention, there is provided a linear motion guide unit in which the porous compact fits over the flexible spine in such a relation that a clearance remains between an outward surface of at least the flexible section of the flexible spine and an inward surface of the porous compact to permit the flexible spine getting flexed to relieve an stress that is exerted on the flexible spine by circulating motion of the rollers. In another aspect of the present invention, the relief portions are larger in transverse section than the flexible middle section lying between the relief portions.

In another aspect of the present invention, there is provided a linear motion guide unit in which the porous compact has an outward surface made curved in transverse section, and an inward surface including therein a recess to fit over the flexible spine and a mating surface to come into engagement with the column, and wherein if the flexible spine is deformed as the rollers roll through the return passage, the porous compact comes into contact on the inward surface thereof with the rollers to lubricate the rollers.

In another aspect of the present invention, a linear motion guide unit is provided in which the tubular skeleton is made of synthetic resinous material while the porous compact is made of sintered resinous material. In a further aspect of the present invention, the tubular skeleton is made up of two longitudinal halves, which join together on their mating lengthwise surfaces lying on the flexible spine that is in rolling-contact with the rolling surfaces of the rollers.

In another aspect of the present invention, there is provided a linear motion guide unit in which the tubular skeleton has forward and aft ends, each of which has an inward surface rectangular in transverse section and an outward surface circular in transverse section, wherein the column in the tubular skeleton extends between the forward and aft ends and has an outward surface made throughout flush with the outward surfaces of the ends, while the flexible spine in the tubular skeleton has relief portions spaced apart from one another in lengthwise of the tubular skeleton and connected to the ends, one to each end, and a flexible middle section extending between the relief portions, the relief portions each having an outward surface sinking below the outward surface of the associated end while the flexible middle section having another outward surface, which is more depressed below the outward surfaces of the relief portions, thereby making the middle section less in thickness than the relief portions. Moreover, all inward surfaces of the column, relief portions and flexible middle section are in coplanar or flush relation with the inward surfaces of the forward and aft ends to make the hole rectangular in transverse section.

In a further another aspect of the present invention, there is provided a linear motion guide unit in which a pair of the columns extends between the ends of the tubular skeleton in diametral opposition to one another, while a pair of the flexible spines extends in diametral opposition to one another, and wherein the lengthwise mating surfaces of the tubular skeleton halves join together in the flexible spines With the linear motion guide unit constructed as stated earlier, especially, the flexible spines are each composed of relief portions spaced apart from one another and merged with forward and aft ends of the tubular skeleton, one to each end, and the flexible middle section extending between the relief portions. As an alternative, additional relief portions may be further made midway in the flexible middle sections of the flexible spines. In any version, the construction that flexible middle sections are connected to the ends of the tubular skeleton through the relief portions makes the flexible spines possible to bear much deflection or flexure. Thus, the relief portions contributes to well alleviation of the deflection caused in the flexible middle section owing to the rolling movement of the rollers, making sure of the steady circulation of the rollers over the long-term operation. In particular, the clearance between the inward surface of the porous compact and the outward surface of the flexible spine leads the flexible spine into following universally the stress exerted on the flexible spine by the rolling movement of the rollers, deflecting to relieve good the stress, thereby making sure of smooth circulation of the rollers.

With the linear motion guide unit according to the present invention, moreover, if the rollers run through the return passage with coming into rolling-contact with porous compact, lubricant impregnated in the porous compact is transferred around the rollers, making certain of sustainable application of lubricant on the rollers rolling through the return passage to realize substantive maintenance-free condition for lubrication. Thus, the linear motion guide unit constructed as stated earlier is expected to serve adequate lubrication in particular operating environments, for example under high-temperature and so on, or in clean rooms required less consumption of lubricant. Moreover, the linear motion guide unit of the present invention, because of the maintenance-free operation requiring no maintenance schedule for lubrication, may well respond to the machines that needs lubrication quality enough to lessen the frictional resistance encountered when the rollers slide over the load race to actuate the slider relatively to the guide rail with high-speed, high-cyclic operating requirements

DETAILED DESCRIPTION OF THE PREFERRED EMBODIMENTS

Referring now in detail to the drawings, the linear motion guide unit according to the present invention will be explained below. The linear motion guide unit according to the present invention is adapted for use in any relatively sliding components in machinery as diverse as various robots, semiconductor manufacturing machines, precision machines, measurement/inspection instruments, medical instruments, micromachines, machine tools, and so on, and more particular constructed to make sure of maintenance-free operation for better lubricant application to the rolling elements, with using a tubular composition for return passage high in mechanical strength to ensure smooth rolling of the rolling elements through a recirculating circuit with accuracy for a long-lasting service life.

The present invention contemplates the lubricant application system on the rolling elements of rollers in the linear motion guide unit disclosed in the commonly assigned Japanese Patent Laid-Open No. 2006-105310 recited earlier to improve the tubular skeleton for the lubricant application system in mechanical strength or stiffness against flexibility, thereby making the lubricant application around the rollers in the circulating circuit more sustainable maintenance-free operation. Although but a tubular composition, tubular skeleton and a porous compact are all illustrated with their lengthwise halfway areas between forward and aft end portions being cut away in FIGS. 3, 5, 8, 10, 13, 15, 16, 18 and 19, it will be appreciated that the cutaway halfway areas actually are identical in their transverse sections to their associated forward and aft end portions shown in the accompanying drawings and extended from end to end.

Figure 1:
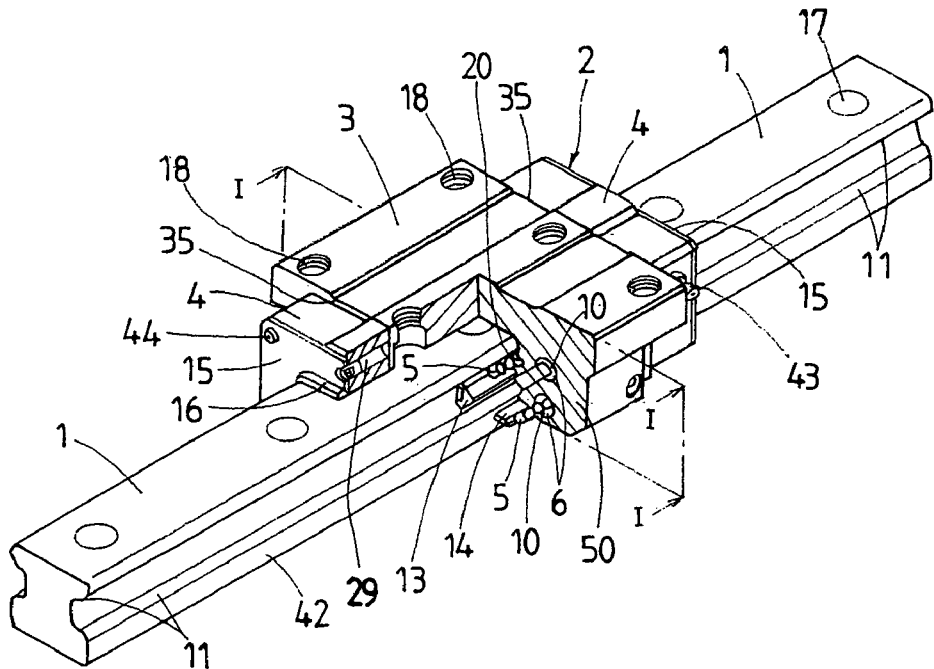
FIG. 1 is a partially cutaway view in perspective of a preferred embodiment of a linear motion guide unit according to the present invention.
Figure 2:
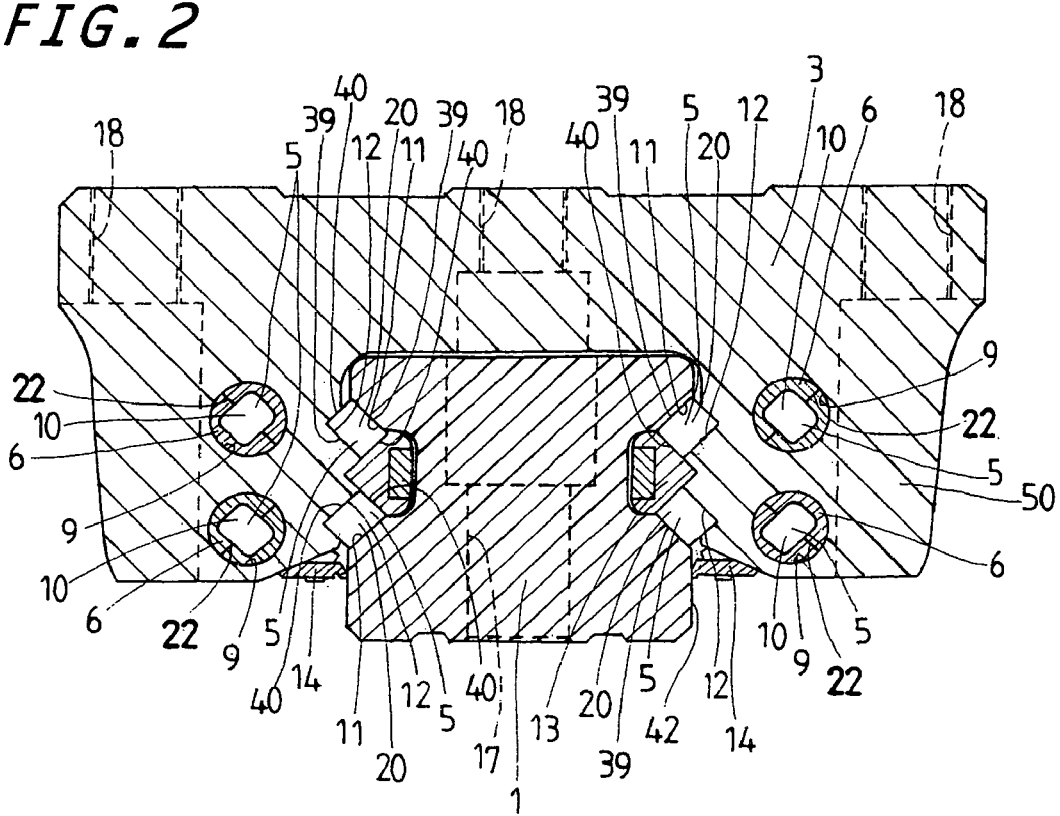
FIG. 2 is a view in transverse section along a plane I-I of FIG. 1 showing the linear motion guide unit.

The linear motion guide unit constructed according to the present invention is best to the construction where the rollers 5 are selected as rolling elements as shown in FIGS. 1 and 2. The linear motion guide unit of the present invention is mainly comprised of an elongated guide rail 1 made on each lengthwise side 42 thereof with a pair of first raceway grooves 11, a slider 2 movable in a sliding manner on the guide rail 1 in a lengthwise direction, and more than one roller 5 allowed rolling through a looped circulating circuit, which is made up of a load-carrying race 20 defined between the guide rail 1 and the slider 2, a return passage 10 made in the slider 2, and turnaround passages 30, shown in FIG. 21, made in the forward and aft ends of the slider 2. In the slider 2, there are included a carriage 3 made with second raceway grooves 12 in opposition to the first raceway grooves 11 of the guide rail 1, and forward and aft end caps 4 made therein with turnaround passages 30 to join the upside and downside races 20 to their associated upside and downside return passages 10, respectively. With the linear motion guide unit constructed as stated earlier, the load-carrying races 20 defined between the first raceway grooves 11 on the guide rail 1 and the second raceway grooves 12 on the carriage 3 are made in sidewise opposing bulgy portions 50 of the carriage 3, two load races 20 to each bulgy portion 50 in all four rows of the load-carrying races 20. More than one cylinder or roller 5 is born on any one of axially opposite ends 40 thereof against an elongated retainer 13 extending along the load-carrying race 20 across the carriage 3 and the end caps 4 to control the rolling movement of the roller 5.

With the linear motion guide unit constructed as shown in FIG. 2, the rollers 5 rolling through one of the paired circulating circuits are allowed to transfer from the upside load-carrying race 20, which is defined between the first and second raceway grooves 11 and 12, into the associated downside return passage 10. In contrast, the rollers 5 rolling through the other of the paired circulating circuits are allowed to transfer from the downside load-carrying race 20 into the associated upside return passage 10. As a result, the slider 2 can move relatively to the guide rail 1. With the linear motion guide unit of the present invention, moreover, a lower seal 14 is disposed to extend over the underneath of the carriage 3 and the forward and aft end caps 4, while end seals 15 are attached to outward end surfaces of the end caps 4. Thus, the linear motion guide unit is made entirely to protect itself against foreign contaminants including fine particles, debris or grits, cutting fluids, and so on. The guide rail 1 is made with some holes 17 that are used to fasten the guide rail 1 to any stationary bed including machine bed, mounting base, workbench, and so on, while the carriage 3 is made with threaded holes 18 that are used to install any object including various instruments, works, attachments, and so on thereon.

Figure 21:
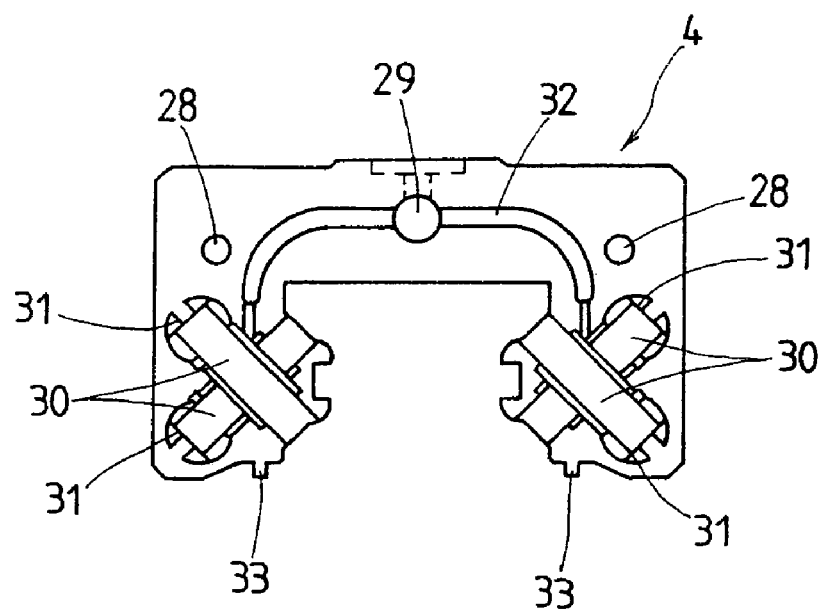
FIG. 21 is a view in rear elevation showing an end cap of the linear motion guide unit of FIG. 1.
Figure 22:
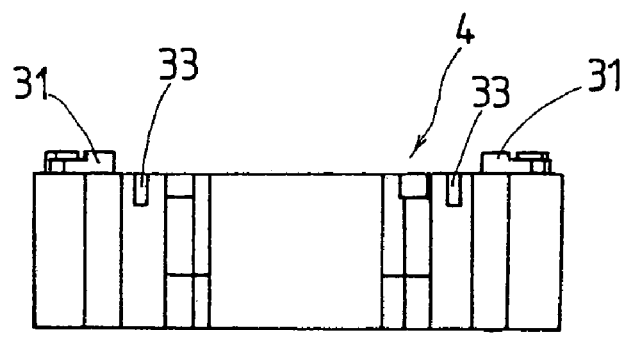
FIG. 22 is a view in bottom elevation of the end cap of FIG. 21.

Moreover, the end seals as shown in FIG. 1 are held in place against the carriage 3 and fastened to the carriage 3 with bolts 44 that are driven into matching holes 28 shown in FIG. 21. The end cap 4 as shown in FIGS. 21 and 22 is made therein with lubrication ports 29 to feed lubricant into the circulating circuits through oiling paths 32, which are also made in the end caps 4. The lubrication ports 29 fit over their associated grease nipples 43, one of which is shown as being positioned in a flank of the end cap 4.

The end caps 4 are provided with spigots 31 having mating ends of reentrant or salient form, which are raised above the rear surfaces of the end caps 4 in a way extending from ingresses or egress of the turnaround passages 30 towards their associated return passages 10. Fit-engagement of the spigots 31 of the end caps 4 with their complementary forward and aft 21 mating ends 41, shown in FIGS. 3, 5 and 8, of a tubular composition 6 makes sure of keeping the tubular composition 6 in place inside a fore-and-aft bore 9 in the carriage 3 between the end caps 4 lying on the forward and aft end surfaces of the carriage 3. Thus, the mating geometry between the spigots 31 of end caps 4 and the complementary ends 41 of the tubular composition 6 makes a positive connection where the return passage 10 and the associated turnaround passages 30 are made flush with one another to finish the recirculating circuit of rectangular shape in transverse section with causing no gap at the connection between the return passage 10 and the turnaround passages 30. Coplanar connection with no gap between the turnaround passages 30 and their associated return passage 10 makes certain of allowing the rollers 5 to transfer smoothly from the turnaround passages 30 to their associated return passage 10 and also from the return passage 10 to the turnaround passages 30 in a circulating manner. On the end caps 4, moreover, there are provided raised portions 33 below the underneath of the end cap 4 to hold in place the lower seal 14, and also mating holes 28 to allow bolts 44 to fasten the end caps 4 to the carriage 3. The tubular composition 6 can be inserted into the fore-and-aft bore 9 in the carriage 3 with, for example hands of an operator. The tubular composition 6 is designed to loose fit into the fore-and-aft bore 9 with leaving a circular clearance of, for example a matter of 0.1 mm between them. Thus, the tubular composition 6, although lying loosely inside the fore-and-aft bore 9 of the carriage 3, makes fit-engagement at forward and aft ends thereof with the mating spigots 31 of the end caps 4, getting fastened against the slider 2.

With the linear motion guide unit in which the elongated tubular composition 6 is inserted into the fore-and-aft bore 9 in the carriage 3 of the slider 2, the return passage 10 is defined inside a hole 23 rectangular in transverse section in the tubular composition 6. The tubular composition 6 is comprised of the tubular skeleton 7 to make certain of mechanical stiffness or strength in the tubular composition 6 for itself, and a porous compact 8 impregnated with lubricant to ensure adequate lubrication onto the rollers 5. The tubular skeleton 7 is made of, for example any synthetic resin, while the porous compact 8 is made of any sintered resinous material. The roller 5 is a cylinder having a cylindrical outside surface for rolling surface 39 and axially opposite ends 40.

Figure 3:
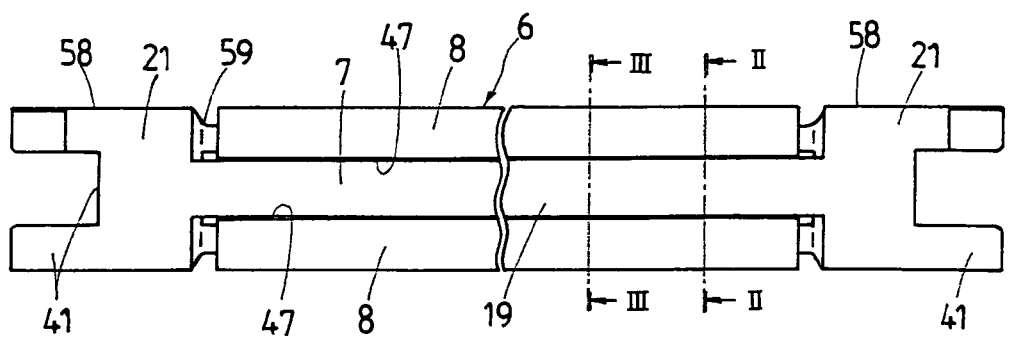
FIG. 3 is a view in front elevation, partially broken away, of a tubular composition to fit into a fore-and-aft bore in a slider of the linear motion guide unit of FIG. 1.
Figure 4:
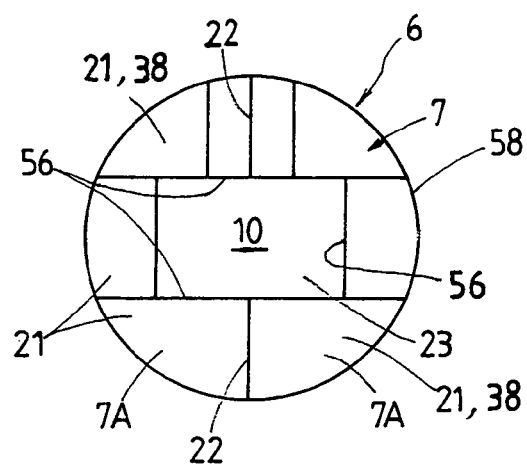
FIG. 4 is a view in side elevation of the tubular composition of FIG. 3.
Figure 5:
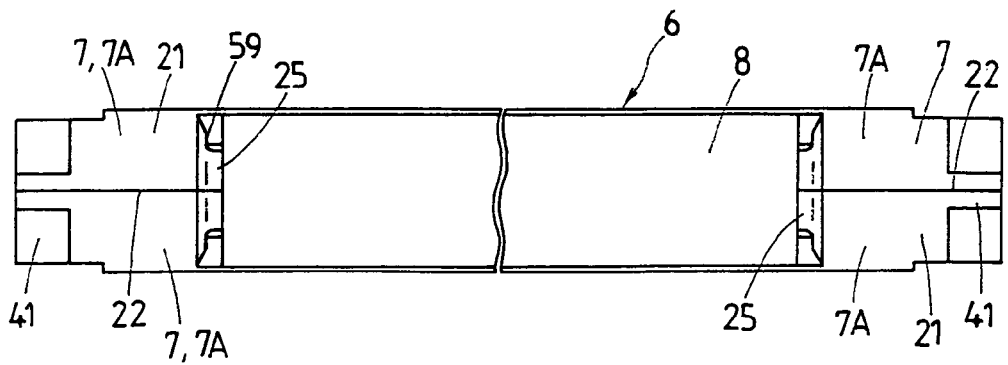
FIG. 5 is a view in plan, partially broken away, of the tubular composition of FIG. 3.
Figure 6:
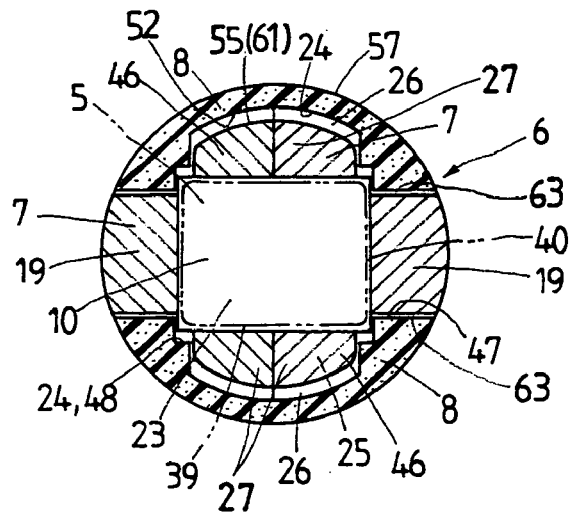
FIG. 6 is a view in transverse section of the tubular composition and taken on the plane of the line II-II of FIG. 3.
Figure 7:
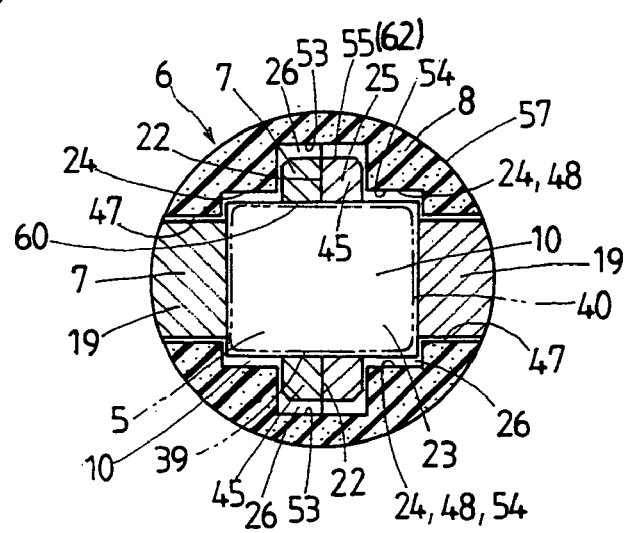
FIG. 7 is a view in transverse section of the tubular composition and taken on the plane of the line III-III of FIG. 3.

The tubular composition 6 as shown in FIGS. 4, 6 and 7 is formed in a circular contour as a whole viewed in transverse section to have a cylindrical outside surface, while a central axial hole 23 for the return passage 10 as shown in FIGS. 6 and 7 is formed to have a rectangular configuration in transverse section. The tubular composition 6, as shown in FIGS. 3 to 5, is composed of the tubular skeleton 7 to guide the rollers 5 through there and the porous compacts 8 to feed lubricant around the rollers 5. The whole skeleton 7 has a circular outward surface and a rectangular inward surface to define the central axial hole 23 for the return passage 10, which is rectangular in transverse section having a dimension of just over an axial section of the cylindrical roller 5 to allow the rollers 5 rolling through there with smoothness.

With the linear motion guide unit in which the elongated tubular composition 6 is made from the tubular skeleton 7 combined with the porous compacts 8 as shown especially in FIGS. 3 to 7, the return passage 10 is defined by the central axial hole 23 inside the tubular composition 6 that fits into the fore-and-aft bore 9 in the carriage 3. The tubular skeleton 7 to guide the rollers 5 through there and the porous compacts 8 to apply lubricant around the rollers 5 are all made to provide the central axial hole 23 rectangular in transverse section inside the tubular composition 6. The tubular skeleton 7 is comprised of lengthwise columns 19 coming into sliding-contact with the axially opposite ends 40 of the rollers 5 to bear the rollers 5, and flexible spines 25 coming into rolling-contact with circular rolling surfaces 39 of the rollers 5 to guide the rollers 5.

Figure 8:
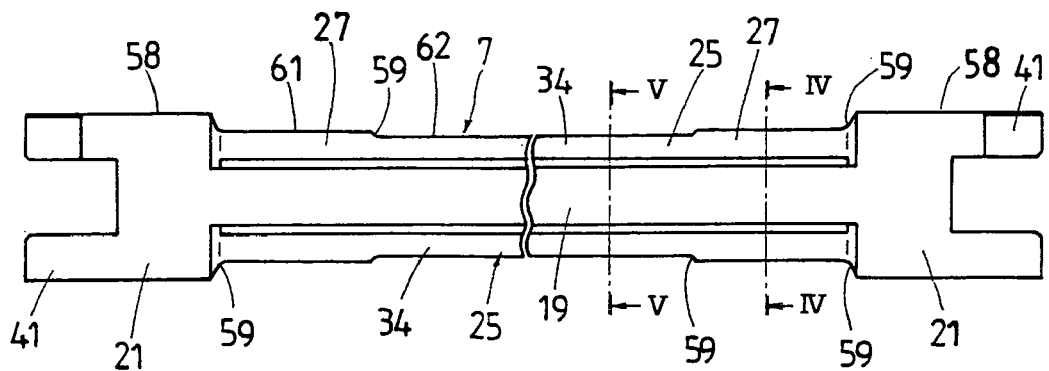
FIG. 8 is a view in front elevation, partially broken away, of a tubular skeleton for the tubular composition of FIG. 3.
Figure 9:
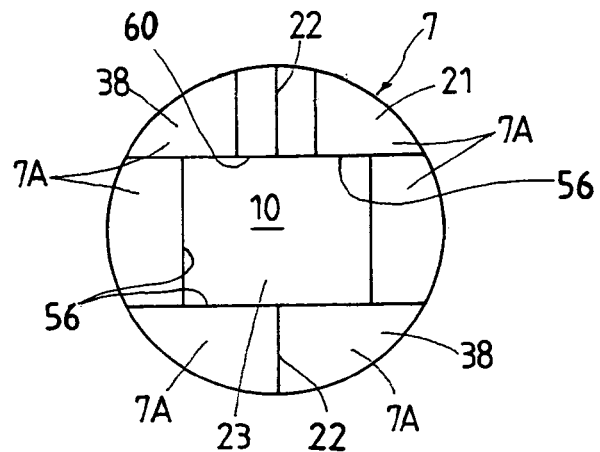
FIG. 9 is a view in side elevation of the tubular skeleton of FIG. 8.
Figure 13:
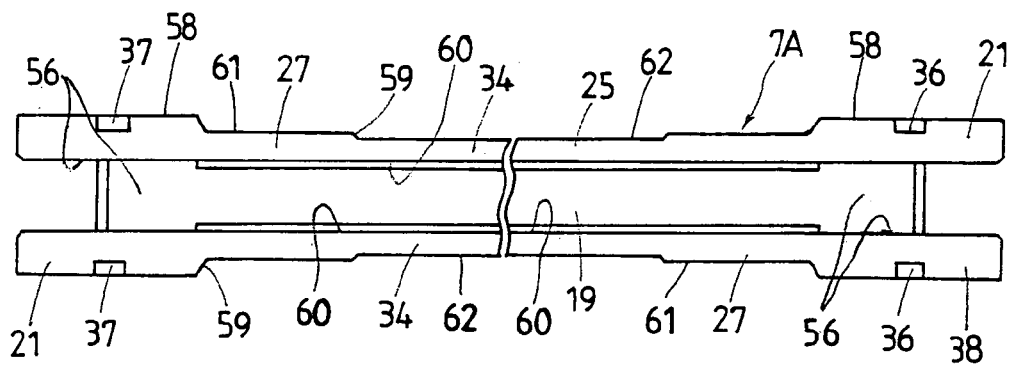
FIG. 13 is a view in front elevation of a lengthwise half section of the tubular skeleton shown in FIG. 8, as seen looking into the interior thereof.

The tubular skeleton 7, as seen in FIGS. 8 to 12, is made up of forward and aft ends 21 each having a rectangular inward surface 56 and a circular outward surface 58, a pair of lengthwise columns 19 extending between the forward and aft ends 21 in diametral opposition to one another to guide the axially opposite ends 40 of the rollers 5, and a pair of flexible spines 25 extending in diametral opposition to one another to guide the circular rolling surfaces 39 of the rollers 5. With the tubular skeleton 7 constructed as stated earlier, the lengthwise columns 19 as shown in FIG. 8 are made to have lengthwise outward surfaces that are throughout flush with the circular outward surfaces 58 of the forward and aft ends 21, while the flexible spines 25 have lengthwise opposite relief portions 27 spaced apart from each other to join with their associated ends 21, and a flexible middle section 34 extending between the lengthwise opposite relief portions 27. In the flexible spine 25 constructed as stated just earlier, the lengthwise opposite relief portions 27 are each made to have an outward surface 61, shown at 55 in FIG. 6, which is depressed below the circular outward surfaces 58 of the forward and aft ends 21, while the flexible middle section 34 has another outward surface 62, shown at 55 in FIG. 7, which is more depressed as seen in FIG. 8 than the outward surfaces 61 of the relief portions 27, thereby making the middle section 34 less in thickness and more flexible than the relief portions 27. With the tubular skeleton 7, moreover, all inward surfaces of the lengthwise columns 19, relief portions 27 and flexible middle sections 34 are in coplanar or flush relation with the inward surfaces 56 of the forward and aft ends 21 as shown in FIG. 13.

The porous compacts 8, as shown in FIGS. 6 and 7, are placed to fit over the flexible spines 25 between the forward and aft ends 21 of the tubular skeleton 7 in such a relation that widthwise opposite mating surfaces 47 of the porous compacts 8 come into abutment against lengthwise flanks 63 of the lengthwise arms 19. In the version recited now, the relief portions 27 in the flexible spines 25 are made in only specific locations adjacent to and merging with their associated ends 21 of the tubular skeleton 7. However, especially in alternative version the flexible middle section 34 is longer in lengthwise direction, additional relief portions, although not shown, may be further made midway in the flexible middle section 34, thereby to increase the mechanical strength of the flexible spines 25 themselves and also control deflection of the flexible middle sections 34.

The tubular composition 6 of the present invention, as shown in FIGS. 6 and 7, features that there is made a clearance 26 between the outward surface 55 of the flexible spine 25 and an inward surface 24 of the porous compact 8. The clearance 26 comes to play an important role in allowing the flexible spine 25 to deflect, alleviating a stress exerted on the flexible spine 25 by circulating motion of the rollers 5. On the other hand, the porous compact 8 has an outward surface 57 of semicircular configuration and an inward surface 24 whose lengthwise center is cut deep to make a middle groove 53 flanked by sidewise opposing grooves 54 less in depth than the middle groove 53. After the porous compact 8 has fit over the flexible spine 25 of the tubular skeleton 7, the clearance 26 is made between the inward surface 24 defining the grooves 53, 54 and the outward surface 55 of the flexible spine 25.

With the linear motion guide unit of the present invention, as shown especially in FIG. 7, the inward surfaces 24 of the porous compacts 8 are exposed partially through windows open between locations the lengthwise columns 19 and the flexible spines 25 of the tubular skeleton 7 to the rollers 5 rolling through a non-loaded race in the return passage 10. The inward surfaces 24 are set some distance back from the non-loaded race inside the central axial bore 23. Thus, as the rollers 5 run through the return passage 10, the flexible spines 25 experience deflections owing to the stress exerted thereon by circulating motion of the rollers 5, thereby allowing the rollers 5 to come into rolling-contact with the inward surfaces 24 of the porous compacts 8 to ensure proper lubrication.

Figure 10:
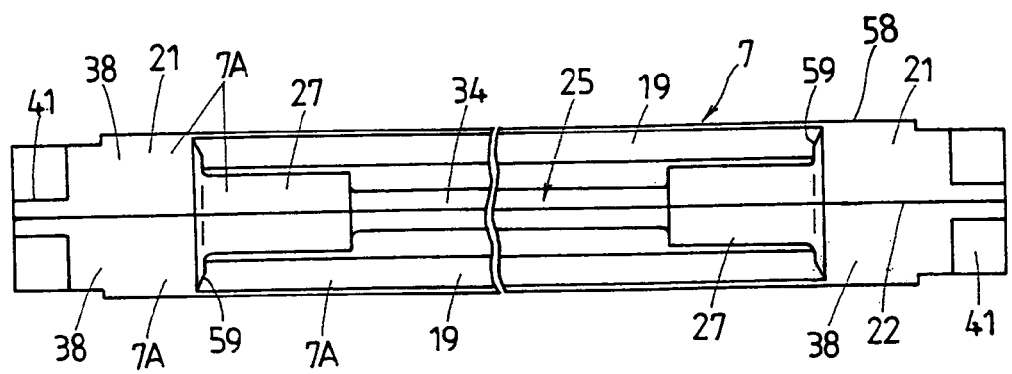
FIG. 10 is a view in plan, partially broken away, of the tubular skeleton of FIG. 8.

The linear motion guide unit of the present invention, moreover, features that the flexible spines 25 especially as shown in FIGS. 8 and 10 are each composed of the relief portions 27 extending at least in part over partial regions situated near the forward and aft ends 21 of the tubular skeleton 7, and the flexible middle sections 34 extending between the relief portions 27 so as to get deflected as the rollers 5 roll through there. Moreover, there are provided clearances 26 between the outward surfaces 62(55) of the flexible spines 25, at least the flexible middle sections 34 and the inward surfaces 24 of the porous compacts 8 to alleviate or relieve successive stress caused by circulating motion of the rollers 5. The porous compacts 8, as shown in FIGS. 3 to 7, are each arranged to cover all the relief portions 27 and the flexible middle section 34. With tubular skeleton 7 constructed as shown in FIGS. 8 to 12, the flexible spines 27 has the forward and aft relief portions 27 larger in transverse section than the flexible middle section 34 lying between the relief portions 27. In the flexible spines 27 in the tubular skeleton 7, thus, the flexible middle sections 34 are connected together with their associated forward and aft ends 21 through gently-sloping tapered corners to alleviate the load imposed by the stress concentration which will be otherwise greater at the reentrant corners adjoining the forward and aft ends 21 when the flexible middle section 34 is subjected to the deflection, thereby increasing the mechanical stiffness against the deflection of the flexible spines 27. Moreover, if the reentrant corners between the ends 21 and the relief portions 27 and between the relief portions 27 and the flexible middle sections 34 are made beveled at 59, the mechanical stiffness of the flexible spines 27 is are further raised to ensuring the sustainable flexibility of the flexible spines 25 for a long-lasting service life.

Figure 11:
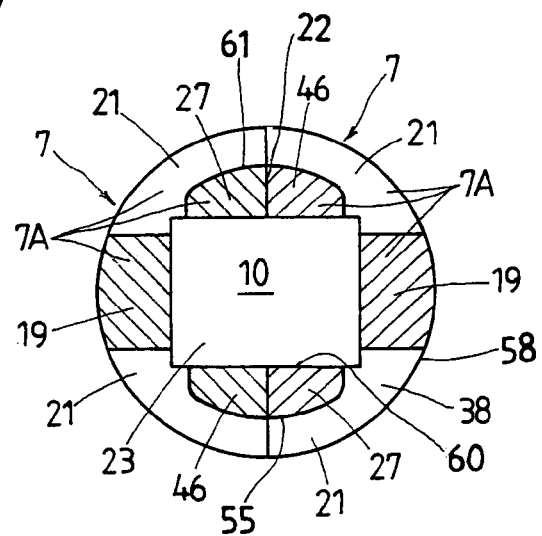
FIG. 11 is a view in transverse section of the tubular skeleton and taken on the plane of the line IV-IV of FIG. 8.
Figure 12:
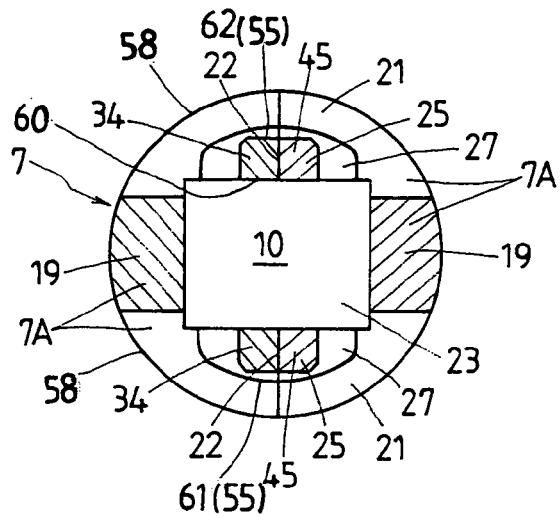
FIG. 12 is a view in transverse section of the tubular skeleton and taken on the plane of the line V-V of FIG. 8.

The lengthwise columns 19, as shown in FIG. 11, are made integral with the forward and aft ends 21 in a construction that their outward and inward surfaces are coplanar or flush with their associated outward and inward surfaces of the ends 21. The lengthwise columns 19 are placed in diametrically opposition to each other in a way lying facing the axially opposite ends 40 of the rollers 5 to come into sliding contact with the axially opposite ends 40 of the rollers 5, ensuring the positive guidance of the rollers 5. The flexible spines 25 are made independent of the lengthwise columns 19 and placed in diametrically opposition to each other in orientation normal to the lengthwise columns 19 to come into rolling-contact with the rolling surfaces 39 of the rollers 5. Inward surfaces 60 of the flexible spines 25 are made coplanar with the inward surfaces 56 of the ends 21 of the tubular skeleton 7 while the outward surfaces 55 of the flexible spines 25 sink radially below the outward surfaces 58 of the ends 21. Moreover, the flexible spines 25 each have the relief portions 27 joined with the forward and aft ends 21 and made somewhat less in thickness than the ends 21, and the flexible middle section 34 extended between the relief portions 27 and made further less in thickness than the relief portions 27 to ensure a desired amount of deflection.

Figure 14:
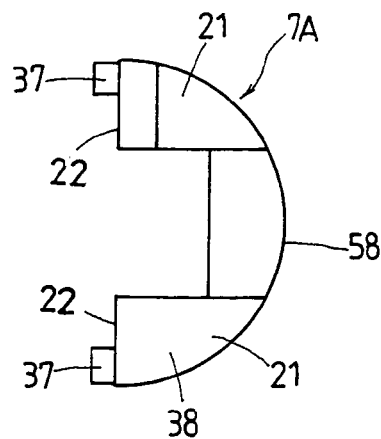
FIG. 14 is a view in side elevation of the lengthwise half section of the tubular skeleton of FIG. 13.
Figure 15:
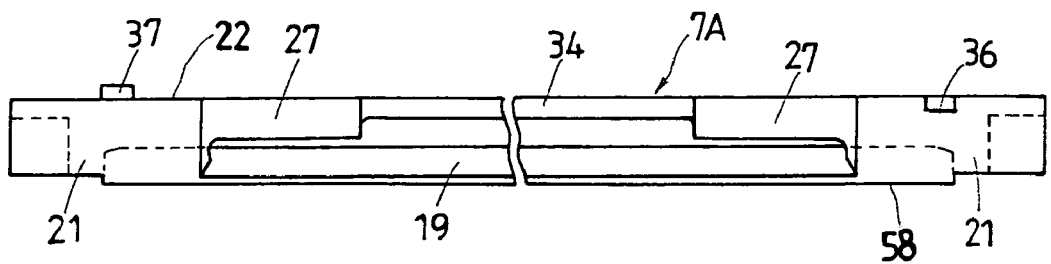
FIG. 15 is a view in lower side elevation of the lengthwise half section of the tubular skeleton of FIG. 13.

The tubular skeleton 7 as shown in FIGS. 13 to 15 is made up of two longitudinal halves 7A and 7A, which join together on their mating lengthwise surfaces 22. Division of the tubular skeleton 7 into two longitudinal halves 7A and 7A is taken on a diametral plane to divide the flexible spines 25 into two halves, splitting the forward and aft ends 21, relief portions 27 and the flexible middle sections 34 into end halves 38, relief portion halves 46 and flexible middle section halves 45, respectively, thereby rendering the flexible spines 25 more susceptible to elastic deformation. After the longitudinal halves 7A have combined together with one another to finish the tubular skeleton 7, the mating longitudinal surfaces 22 of the longitudinal halves 7A extend to come into rolling-contact with the rolling surfaces 39 of the rollers 5, especially lying on the flexible spines 25 and reaching the forward and aft ends 21 lying on the extension of the flexible spines 25. On any one of the mating longitudinal surfaces 22, reentrants 36 are made at any one of the forward and aft ends 21. In contrast, on the other mating longitudinal surface 22, there are made salients 37 complementary to the reentrants 36 at the other ends 21. Upon assembly of the longitudinal halves 7A to finish the tubular skeleton 7, after getting the mating longitudinal surfaces 22 faced each other in opposite direction, only fitting the salients 37 on any one of the mating longitudinal surfaces 22 into their complementary reentrants 36 on the other confronting mating longitudinal surface 22 makes sure of accurate location between the longitudinal halves 7A to complete the tubular skeleton 7 with ease. Division of the tubular skeleton 7 into two longitudinal halves 7A is advantageous to make molding operation of synthetic resin material easier, making mass production of the tubular skeleton 7 even easier.

Figure 16:
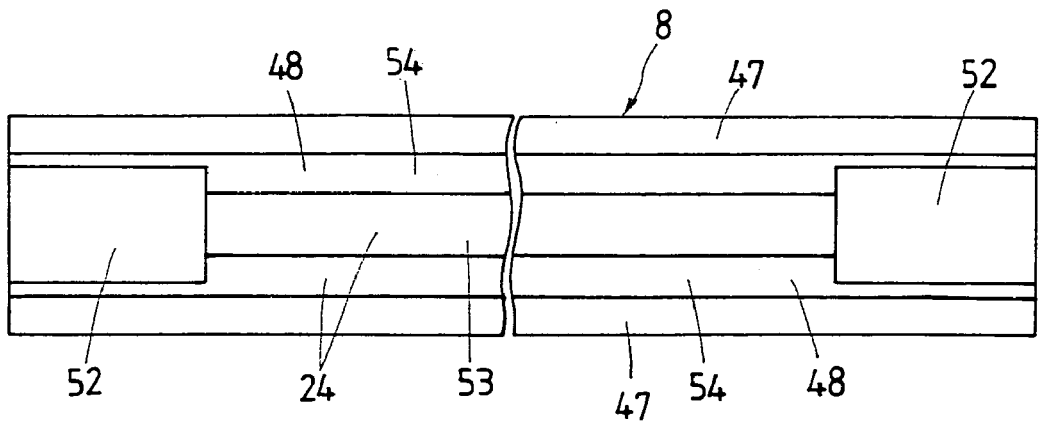
FIG. 16 is a view in front elevation of a porous compact to fit into the tubular skeleton to complete the tubular composition of FIG. 3, as seen looking into the interior thereof.
Figure 17:
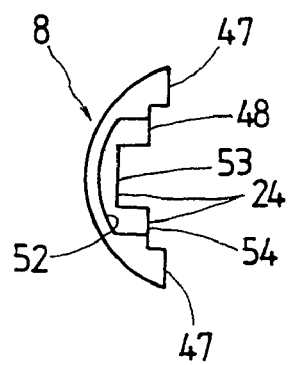
FIG. 17 is a view in left side elevation of the porous compact FIG. 16.

The porous compact 8 as shown in FIGS. 16 and 17 is made to fit over or conform to the flexible spine 25 of the tubular skeleton 7 across the overall length between the forward and aft ends 21 of the tubular skeleton 7 to cover widthwise the window lying between the diametral opposite lengthwise columns 19 of the tubular skeleton 7. The porous compact 8 has a circular outward surface 57 made coplanar or flush with the outward surfaces 58 of the forward and aft ends 21 of the tubular skeleton 7. In an inward surface 24 of the porous compact 8, in contrast, there are made the widthwise opposite mating surfaces 47 to come into abutment against the lengthwise flanks 63 of the lengthwise spines 19, the widthwise opposite grooves 54 sinking below the mating surfaces 47 and extending beside the mating surfaces 47 to provide the non-loaded return race 48, forward and aft recesses 52 sinking deep below the non-loaded return race 48 of the widthwise opposite grooves 54 to fit over the relief portions 27 of the flexible spine 25 nearby the forward and aft ends 21 of the tubular skeleton 7, and the middle groove 53 set back from the widthwise opposite grooves 54 and extending between the forward and aft recesses 52 to fit over the flexible middle section 34 of the flexible spine 25, which defines the non-loaded return race 48. With the porous compact 8 constructed as stated earlier, as shown in FIG. 7, the middle deep groove 53 fits over the flexible spine 25 that bears the rollers 5 against their rolling surfaces 39, while the widthwise opposite grooves 54 lie on both sides of the flexible spine 25 to define the non-loaded return race 48. Moreover, there remains the clearance 26 between a bottom of the deep middle groove 53 and the outward surface 55 of the flexible spine 25 to make the flexible spine 25 easier to experience elastic deflection or deformation. Inward surfaces of the widthwise opposite grooves 54 to form the non-loaded return races 48 on the opposite sides of the flexible spine 25 are somewhat set back from the non-loaded return races 48 to make elastic deflection of the flexible spine 25 much easier. Elastic deflection of the flexible spine 25 causes the non-loaded return races 48 inside the widthwise opposite grooves 54 to come into contact with the rollers 5. After the widthwise opposite grooves 54 have brought into contact with the rollers 5, the lubricant or lubricating oil impregnated in the porous compact 8 is applied around the rollers 5, and then transferred to the load-carrying race 20 as the rollers 5 roll through there.

The tubular composition 6 is composed of a pair of lengthwise halves 7A of the tubular skeleton 7 having mechanical strength sufficient to guide the rollers 5 in good rolling order through the circulating circuit over the long-lasting service life, and a pair of porous compacts 8 combined together with the tubular skeleton 7, the porous compacts 8 having the ability of soaking up, retaining and delivering lubricant. The tubular skeleton 7 is made to guide the rollers 5 in good rolling order through the circulating circuit, especially the return passage 10 over the long-lasting service life. Particularly, the tubular skeleton 7, despite of high in mechanical strength or stiffness, experiences little scuffing or wear that would otherwise cause any rolling motion of the rollers 5 including pushing force of the rolling surfaces 39 of the rollers 5 against the flexible spines 25, sliding contact of the axially opposite ends 40 of the rollers 5 against the lengthwise column 19, frictional engagement of the circular edges of the rollers 5 against the lengthwise column 19 and so on. The tubular skeleton 7, although but made of any material selected from metals such as aluminum and the like, and resins such as synthetic resins and the like, is made of a very conservative synthetic resin, for example polyacetal in the version described here. On the other hand, the porous compacts 8 fit between the diametrically opposite flexible spines 25 in opposition to one another. Material for the porous compact 8 is unspecified so long as the porous structure of the compact is well preserved to sustain the absorption, retention and delivery of lubricant, with high in wear proof property. The porous compact 8 in the version described now is made of sintered resin in which powders are fused or sintered only around grain boundaries between two or more initially distinct particles and further compacted in a way cells or interstices are preserved among grains. In the embodiment recited here, the porous compact 8 was made of, for example a sintered compact product of a powder of ultrahigh molecular weight polyethylene, in which cells or pores communicated together through interstices are well preserved. The porous compact 8 of the sintered resinous material constructed as stated earlier is previously impregnated with lubricant that fills in cells and interstices preparatory to assembly with the tubular skeleton 7. As an alternative, the porous compact 8 is first installed in the tubular skeleton 7 without subject to previous impregnation with lubricant. Lubricant fed through the lubrication port 29 is absorbed and retained in the porous compact 8 to be delivered around the rollers 5.

Figure 18:
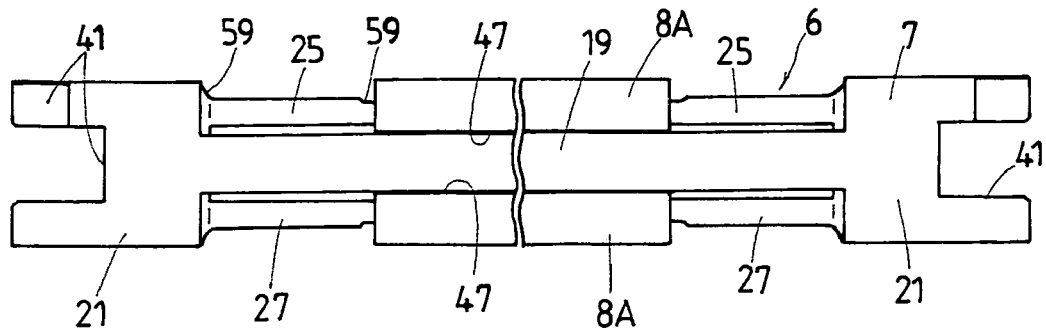
FIG. 18 is a view in front elevation, partially broken away, of another version of the tubular composition to fit into the fore-and-aft bore in the slider of the linear motion guide unit of FIG. 1.
Figure 19:
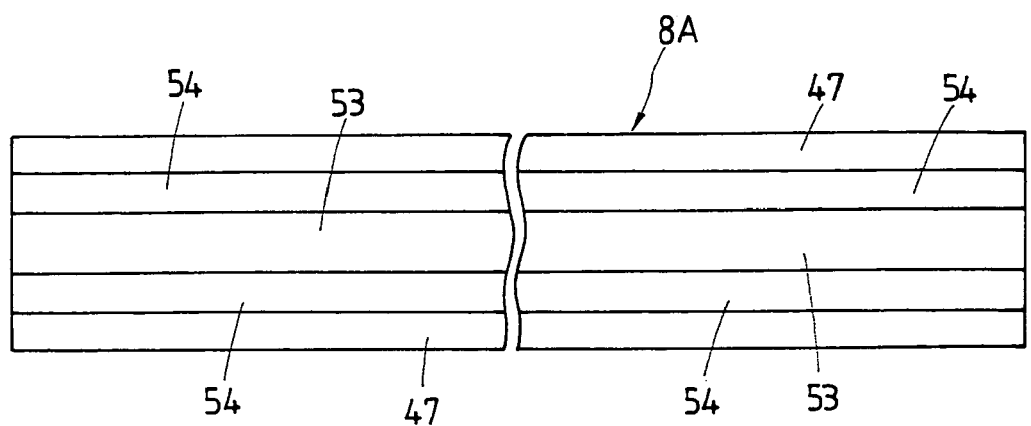
FIG. 19 is a view in front elevation of the porous compact to fit into the tubular skeleton to complete the tubular composition of FIG. 18, as seen looking into the interior thereof.
Figure 20:
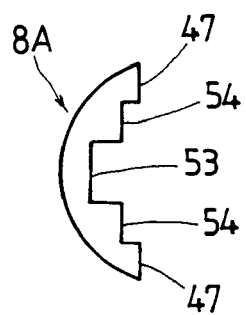
FIG. 20 is a view in left side elevation of the porous compact FIG. 19.

Referring to FIGS. 18 to 20, there is another version of the tubular composition 6 to be built in the linear motion guide unit. The tubular composition 6, as shown in FIGS. 19 and 20, is substantially equivalent or identical to the previously described first version, but a porous compact 8A is different in length from the porous compact 6 in the first version. To that extent, the components have been given the same reference characters, so that the previous description will be equally applicable. Compared with the first porous compact 8, the second porous compact 8A lacks sections to face onto the relief portions 27 of the flexible spine 25 in the tubular skeleton 7, having only the length corresponding to the flexible middle section 34 in the flexible spine 25. The porous compact 8A, because of shortened by the length of the forward and aft recesses 52, shown in FIG. 16, to fit over the relief portions 27 compared with the first porous compact 8, makes production thereof easier as well as requires less impregnation of lubricant than the first porous compact 8. Nevertheless, the choice of the second porous compact 8A will be used successfully in the linear motion guide unit that is selected depending on economic considerations including cost of the tubular composition 6 by itself, production cost of the second porous compact 8A, as well as operating conditions including how to use the tubular composition 6, and so on.

What is claimed is:

1. A linear motion guide unit comprising:
   an elongated guide rail having a first raceway groove extending lengthwise of the guide rail; and
   a slider allowed to move relatively to the guide rail by virtue of more than one rolling element comprising a plurality of rollers, the slider including:
      a carriage made thereon with a second raceway groove in opposition to the first raceway groove to form a load race between them and further made therein with a return passage extending in parallel with the load race,
      end caps secured to forward and aft ends of the carriage and each made therein with a turnaround passage to connect the load race and the return passage with one another, and
      the plurality of rollers being allowed to roll through a circulating circuit composed of the load race, return passage and a pair of the turnaround passages;
   wherein the return passage is defined by a hole inside a lengthwise tubular construction that fits into a bore made in the carriage, the tubular construction being made up of a tubular skeleton to guide the rollers therethrough and a porous compact to apply lubricant to the rollers, and the tubular skeleton being comprised of a column to guide any one of axially opposite ends of the roller, and a flexible spine to guide a circular rolling surface of the roller; and
   wherein the porous compact fits over the flexible spine in such a relation that a clearance remains between an outward surface of the flexible spine and an inward surface of the porous compact to permit flexing of the flexible spine to relieve a stress that is applied to the flexible spine by circulating motion of the rollers.

2. A linear motion guide unit constructed as defined in claim 1, wherein the porous compact has an outward surface made curved in transverse section, and an inward surface including therein a recess to fit over the flexible spine and a mating surface to come into engagement with the column, and wherein if the flexible spine is deformed as the rollers roll through the return passage, the porous compact comes into contact on the inward surface thereof with the rollers to lubricate the rollers.

3. A linear motion guide unit constructed as defined in claim 1, wherein the tubular skeleton is made of synthetic resinous material while the porous compact is made of sintered resinous material.

4. A linear motion guide unit constructed as defined in claim 1, wherein the tubular skeleton is made up of two longitudinal halves, which join together on their mating lengthwise surfaces lying on the flexible spine that is in rolling contact with the rolling surfaces of the rollers.

5. A linear motion guide unit constructed as defined in claim 1, wherein the tubular skeleton has forward and aft ends, each of which has an inward surface rectangular in transverse section and an outward surface circular in transverse section,
   wherein the column in the tubular skeleton extends between the forward and aft ends and has an outward surface made throughout flush with the outward surfaces of the ends, while the flexible spine in the tubular skeleton has relief portions spaced apart from one another in lengthwise of the tubular skeleton and connected to the ends, one to each end, and a flexible middle section extending between the relief portions, the relief portions each having an outward surface sinking below the outward surface of the associated end while the flexible middle section having another outward surface, which is more depressed below the outward surfaces of the relief portions, thereby making the middle section less in thickness than the relief portions, and further wherein all inward surfaces of the column, the relief portions and the flexible middle section are in coplanar or flush relation with the inward surfaces of the forward and aft ends to make the hole rectangular in transverse section.

6. A linear motion guide unit constructed as defined in claim 5, wherein a pair of the columns extends between the ends of the tubular skeleton in diametral opposition to one another, while a pair of the flexible spines extends in diametral opposition to one another, and wherein the lengthwise mating surfaces of the tubular skeleton halves join together in the flexible spines.

7. A linear motion guide unit comprising:
   an elongated guide rail having a first raceway groove extending lengthwise of the guide rail; and a slider allowed to move relatively to the guide rail by virtue of more than one rolling element of a plurality of rollers, the slider including:

a carriage made thereon with a second raceway groove in opposition to the first raceway groove to form a load race between them and further made therein with a return passage extending in parallel with the load race, end caps secured to forward and aft ends of the carriage and each made therein with a turnaround passage to connect the load race and the return passage with one another, and the plurality of rollers being allowed to roll through a circulating circuit composed of the load race, return passage and a pair of the turnaround passages;

wherein the return passage is defined by a hole inside a lengthwise tubular composition that fits into a bore made in the carriage, the tubular composition being made up of a tubular skeleton to guide the rollers through there and a porous compact to apply lubricant to the rollers, and the tubular skeleton being comprised of a column to guide any one of axially opposite ends of the rollers, and a flexible spine to guide a circular rolling surface of the rollers;

wherein the porous compact fits over the flexible spine in such a relation that a clearance remains between an outward surface of at least the flexible section of the flexible spine and an inward surface of the porous compact to permit flexing of the flexible spine getting flexed to relieve a stress that is exerted on the flexible spine by circulating motion of the rollers; and wherein the flexible spine has relief portions made at least in specific locations merging with their associated ends, and a flexible middle section extending between the relief portions to experience any deflection as the rollers roll through the return passage.

8. A linear motion guide unit constructed as defined in claim 7, wherein the relief portions are larger in transverse section than the flexible middle section lying between the relief portions.

9. A linear motion guide unit constructed as defined in claim 7, wherein the tubular skeleton has forward and aft ends, each of which has an inward surface rectangular in transverse section and an outward surface circular in transverse section, wherein the column in the tubular skeleton extends between the forward and aft ends and has an outward surface made throughout flush with the outward surfaces of the ends, while the flexible spine in the tubular skeleton has the relief portions spaced apart from one another in lengthwise of the tubular skeleton and connected to the ends, one to each end, and the flexible middle section extending between the relief portions, the relief portions each having an outward surface sinking below the outward surface of the associated end while the flexible middle section having another outward surface, which is more depressed below the outward surfaces of the relief portions, thereby making the middle section less in thickness than the relief portions, and further wherein all inward surfaces of the column, the relief portions and the flexible middle section are in coplanar or flush relation with the inward surfaces of the forward and aft ends to make the hole rectangular in transverse section;

10. A linear motion guide unit constructed as defined in claim 9, wherein a pair of the columns extends between the ends of the tubular skeleton in diametral opposition to one another, while a pair of the flexible spines extends in diametral opposition to one another, and wherein the lengthwise mating surfaces of the tubular skeleton halves join together in the flexible spines.

* * * * *